No. 653,154. Patented July 3, 1900.
J. SULLIVAN.
CAR FENDER.
(Application filed Mar. 29, 1900.)
(No Model.)
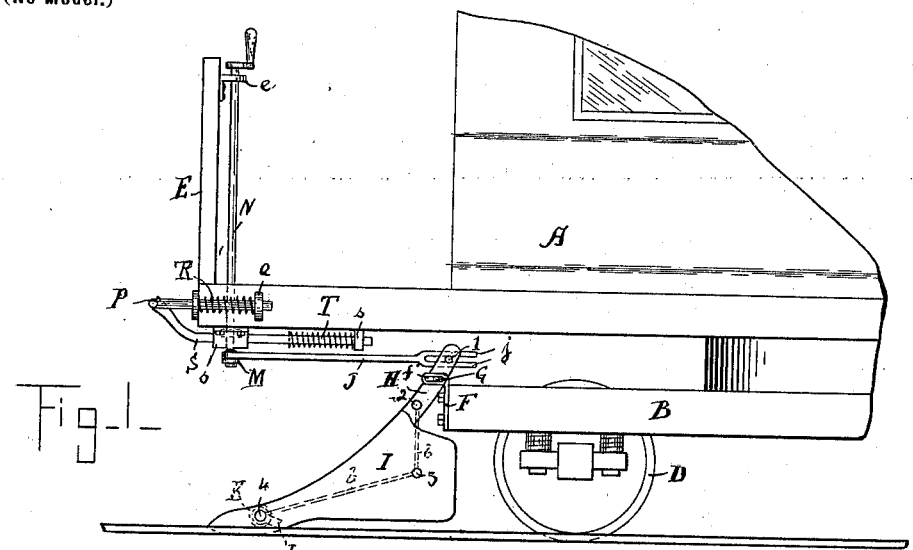
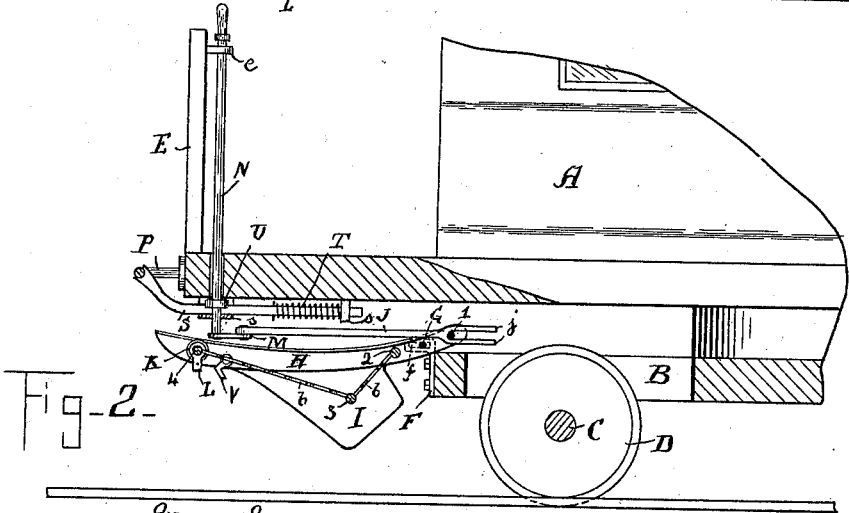
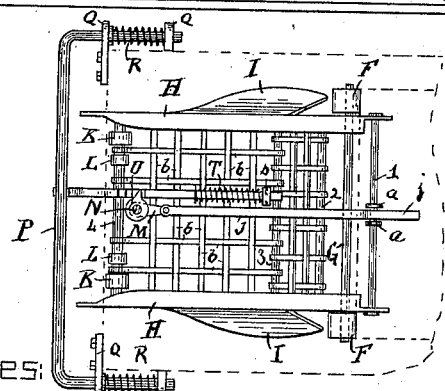
Witnesses:
H. B. Davis.
W. L. Kerwin.
Inventor:
James Sullivan
by Edwin Planta
attorney
THE NORRIS PETERS CO., PHOTO-LITHO., WASHINGTON, D. C.

UNITED STATES PATENT OFFICE.

JAMES SULLIVAN, OF BOSTON, MASSACHUSETTS.

CAR-FENDER.

SPECIFICATION forming part of Letters Patent No. 653,154, dated July 3, 1900.

Application filed March 29, 1900. Serial No. 10,653. (No model.)

*To all whom it may concern:*

Be it known that I, JAMES SULLIVAN, a citizen of the United States, and a resident of Boston, in the county of Suffolk and State of Massachusetts, have invented certain new and useful Improvements in Car-Fenders, of which the following is a specification.

My invention relates to certain improvements in car-fenders; and the invention consists in certain details of construction as hereinafter set forth, and pointed out in the claims.

Referring to the accompanying drawings, Figure 1 represents a side view of a portion of one end of a car fitted with a fender embodying my invention and showing the fender in the lowered position. Fig. 2 is a longitudinal vertical section of same with the fender raised. Fig. 3 is a plan or top view of the fender and buffer.

A represents a portion of the side of a car, B the front truck, C the axle, D the wheels, and E the dashboard, all of which are of the ordinary construction.

To each side of the front of the truck is secured an angle-piece F, having at its upper end a slot *f*, through which passes a bar G, that carries the two angle-iron sides H H of the fender. To each of the sides H are secured wings I to remove anything that the wheels otherwise pass over. These angle-iron sides H H are connected together by four bars 1 2 3 4, the upper bar 1 being fitted with two disks *a a* in its central portion, forming a groove in which the prongs of a fork *j* on the end of a rod J work, as hereinafter described. To the rods 2 3 4 are secured metal slats *b b*, as shown, to form a cradle or receptacle for any article that may be picked up by the fender. The rod 3 extends out beyond the frames H and its ends form supports for the center of the wings I, and the bar 4 is fitted with rollers K, that travel upon the road-bed when the fender is lowered, and in order to prevent the fender when lowered from striking the road-bed with too great a shock I fit buffers L to said bar 4, which first strike the road-bed and then turn as the car advances, (see Fig. 1,) so as to be out of the way.

It will be seen that by this construction the front points of the sides H H run inside and just below the upper side of the rails and the rollers K on the bar 4 travel upon the road-bed, so that any object on the road-bed will be caught up into the cradle or receptacle or be pushed on one side out of the way of the wheels by the wings I.

The fender is allowed a certain amount of longitudinal movement by means of the slots *f* in the angle-pieces F.

The forward end of the rod J, whose fork *j* embraces the upper rod 1 of the fender, is fulcrumed to a crank M on the end of an upright rod N, that passes up inside of the dashboard E and is supported near its upper end by a bracket *e*, secured to the rear of the dashboard. The upper end of this rod is fitted with a handle which when turned so as to be at right angles to the dashboard causes the inner end of the fork *j* to come into contact with the rod 1, pushing it back, thus raising the fender clear of the ground, and when said handle is turned in line with the dashboard the rod J is drawn forward, so that its fork is out of contact with the rod 1 and the fender falls of its own weight, the buffers L on the rod 4 first striking the road-bed and preventing too sudden a jar.

In front of the car I arrange a buffer, so that should the fender be in the raised position (by reason of the driver having neglected to lower it) said buffer will strike the person on the track and cause the fender to be lowered. This buffer consists of a U-shaped bar P, its ends being carried in guides Q, secured to the side of the car-frame, and near each end is fitted a washer ring or pin, against which a coil-spring R rests, the rear end of said spring resting against the rear guide Q. The central portion of the bar P is covered with any suitable soft or yielding substance, so as not to injure a person if struck.

Underneath the central portion of the front of the car is a bar S, free to slide in suitable bearings *s* and held in an extended position by a spring T, so that its end rests against the bar P. The bar S is formed on its upper side with a projection that when pushed back comes into contact with a tooth or projection on a disk U, secured on the rod N, so that when the bar P is forced back the projection on the bar will strike the tooth on the disk U and turn the rod N, thus causing the fender to fall.

To the lower edge of each of the angle-iron sides H is pivoted a small guide-piece V, beveled on its inner side, so that should the fender be a little on one side when it is lowered the end of the guide-piece V will strike the rail and the beveled end will cause the fender to be shifted to its proper position, so that the points of the fender will run inside and a short distance below the top of the rails.

What I claim is—

1. A fender for street-cars consisting of angle-iron sides, connected together by rods, and carried by a rod passing through same, the ends of said rod working in slots formed in angle-pieces attached to the forward end of the truck, whereby said rod is allowed a short longitudinal movement; as set forth.

2. A fender for street-cars consisting of angle-iron sides, connected together by rods; rollers on the outer or lower rod to travel on the road-bed, and buffers on said rod to prevent too great a jar when the fender is lowered.

3. A fender for street-cars, consisting of angle-iron sides and carried by a rod working in slots formed in angle-pieces secured to the forward end of the truck, a longitudinal rod forked at one end to embrace the upper or rear connecting-rod of the sides, an upright rod inside of the dashboard having a handle at its upper end and a crank at its lower end connected to the forward end of said longitudinal rod; as and for the purpose set forth.

4. In combination with a car buffer and fender, a bar arranged longitudinally under the front end of the car-body, and held by a spring so that its forward end is in contact with the buffer, said bar having a projection on its upper side, and a disk on the upright rod, said disk having a tooth or projection in contact with the former projection for operating the fender; substantially as and for the purpose set forth.

In testimony whereof I have affixed my signature in presence of two witnesses.

JAMES SULLIVAN.

Witnesses:
CALEB H. SWAN,
EDWIN PLANTA.